United States Patent
Lee et al.

(10) Patent No.: US 8,594,644 B2
(45) Date of Patent: Nov. 26, 2013

(54) DEVICE AND METHOD FOR EXECUTING RESERVED FUNCTION IN MOBILE COMMUNICATION TERMINAL

(75) Inventors: Chung Kyu Lee, Seoul (KR); Hyun Woo Kim, Daegu (KR); Young Jun Jung, Gumi-si (KR); Ho Kwon Song, Seoul (KR); Jeong Wook Seo, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1514 days.

(21) Appl. No.: 11/946,090

(22) Filed: Nov. 28, 2007

(65) Prior Publication Data

US 2008/0153475 A1 Jun. 26, 2008

(30) Foreign Application Priority Data

Dec. 23, 2006 (KR) .................. 10-2006-0133281

(51) Int. Cl.
  *H04M 3/00* (2006.01)
(52) U.S. Cl.
  USPC ............. 455/418; 455/75; 455/73; 455/574; 455/333; 455/126; 455/452.1; 455/323; 455/275; 455/558; 455/179.1; 455/12.1; 455/62; 455/3.06
(58) Field of Classification Search
  USPC ......... 455/75, 73, 574, 333, 126, 552.1, 323, 455/275, 558, 179.1, 12.1, 62, 3.06, 412.1, 455/3.01, 186.1; 370/394, 328, 537, 312, 370/476, 331, 349, 345, 516
  See application file for complete search history.

(56) References Cited

U.S. PATENT DOCUMENTS

| 6,778,537 | B1 * | 8/2004 | Ishibashi | 370/395.62 |
| 7,315,686 | B2 * | 1/2008 | Sakamoto | 386/235 |
| 7,362,838 | B2 * | 4/2008 | Mizukami et al. | 375/362 |
| 7,821,573 | B2 * | 10/2010 | Onoue | 348/460 |

(Continued)

FOREIGN PATENT DOCUMENTS

| DE | 198 04 188 | 8/1999 | ............... H04B 1/38 |
| JP | 2006-311016 | 11/2006 | ............... H04B 1/16 |

(Continued)

OTHER PUBLICATIONS

Watambe Takashi, Kyocera corp. Mobile Broadcast receiver and received time correction method, published Sep. 11, 2006 trasnslation realized from a JP 2006311016.*

(Continued)

*Primary Examiner* — Joseph Arevalo
(74) *Attorney, Agent, or Firm* — Cha & Reiter, LLC

(57) ABSTRACT

A device and method for executing a reserved function using time information extracted from a broadcasting data that provides a correct time in asynchronous mobile communication terminal are provided. The method of executing a reserved function in a mobile communication terminal includes: when a broadcasting function is executed, performing (1) extracting a time information from received broadcasting data, (2) calculating a time difference between a time of the extracted time information and a corresponding operating time of the mobile communication terminal, and (3) storing the calculated time difference as a time difference information; and if a reservation time for executing a specific function is set and when the operating time reaches the set reservation time based on the stored time difference information, executing the specific function.

18 Claims, 4 Drawing Sheets

(56) References Cited

U.S. PATENT DOCUMENTS

| | | | |
|---|---|---|---|
| 2003/0091328 A1* | 5/2003 | Ishii et al. | 386/46 |
| 2004/0109519 A1* | 6/2004 | Mizukami et al. | 375/362 |
| 2005/0240975 A1* | 10/2005 | Kim | 725/100 |
| 2006/0048182 A1* | 3/2006 | Kim | 725/38 |
| 2006/0135057 A1* | 6/2006 | Park et al. | 455/3.06 |
| 2007/0036035 A1* | 2/2007 | Cho et al. | 368/12 |

FOREIGN PATENT DOCUMENTS

| | | | | |
|---|---|---|---|---|
| KR | 10-2000-0035075 A | 6/2000 | | |
| KR | 10-2006-0027496 A | 3/2006 | | |
| KR | 10-2006-0124523 A | 12/2006 | | |
| WO | WO 02/01879 | 1/2002 | | H04N 7/24 |
| WO | WO 2005/076503 | 8/2005 | | H04H 1/00 |

OTHER PUBLICATIONS

Kang, Jung-min; et al.; Patent Application Publication No. US 2006/0268665 A1; Publication Date: Nov. 30, 2006; "Method and Apparatus for Setting RTC Time of Digital . . . ;" . . . .

* cited by examiner

DEVICE AND METHOD FOR EXECUTING RESERVED FUNCTION IN MOBILE COMMUNICATION TERMINAL

CLAIMS OF PRIORITY

This application claims priority to an application entitled "DEVICE AND METHOD FOR EXECUTING RESERVED FUNCTION IN MOBILE COMMUNICATION TERMINAL" filed in the Korean Intellectual Property Office on Dec. 23, 2006 and assigned Serial No. 2006-0133281, the entire contents of which are incorporated herein by reference.

BACKGROUND OF THE INVENTION

1. Field of the Invention

The present invention relates to a mobile communication terminal, and more particularly, to a device and method for executing a reserved function in a mobile communication terminal that can execute a reserved function at a correct time in an asynchronous mobile communication terminal.

2. Description of the Related Art

In general, a mobile communication method is divided into a synchronous mobile communication method that uses a Global Positioning System (GPS), which is mainly used in North America, and an asynchronous mobile communication method that does not use the GPS, which is mainly used in Europe. A typical asynchronous mobile communication method is a Global System for Mobile communications (GSM). The GSM is a method in which a Frequency Division Multiple Access (FDMA) method and a Time Division Multiple Access (TDMA) method are combined in order to perform multiple access. The GSM has been used worldwide by major subscribers.

However, unlike a synchronous mobile communication terminal, in which a time is set by synchronizing with a GPS satellite upon initializing, a time in an asynchronous mobile communication terminal is directly set by a user. The time set by the user is operated by a built-in clock generator. Therefore, if the user does not set the time accurately or if the clock generator does not operate accurately, a difference is generated between the real time and the time of the mobile communication terminal.

Upon setting a time-based reservation of a specific function, such as schedule notification, morning call, and reservation recording of broadcasting to a specific time, such a time difference can be an inconvenience to the user. Particularly, when the user sets a reservation recording function of important broadcasting or sets an alarm function for an important appointment, an incorrect time of the asynchronous mobile communication terminal may cause serious damage to the user.

SUMMARY OF THE INVENTION

The present invention provides a device and method for executing a reserved function in a mobile communication terminal that can execute a reserved function at a correct time.

The present invention further provides a device and method for executing a reserved function in a mobile communication terminal that can adjust a time of the mobile communication terminal using received broadcasting data.

In accordance with an embodiment of the present invention, a method of executing a reserved function in a mobile communication terminal includes the steps of: when a broadcasting function is executed performing the steps of—, (1) extracting time information from received broadcasting data, (2) calculating a time difference between a time of the extracted time information and a corresponding operating time of the mobile communication terminal, and (3) storing the calculated time difference as a time difference information; and executing; if a reservation time for executing a specific function is set, when the operating time of the mobile communication terminal reaches the set reservation time based on the stored calculated time difference information, executing the specific function.

In accordance with another embodiment of the present invention, a method of executing a reserved function in a mobile communication terminal includes the steps of: when a broadcasting function is executed, performing the steps of—, (1) extracting time information from a received broadcasting data, (2) adding a clock function based on the extracted time information, and (3) executing the clock function; and if a reservation time for executing a specific function is set, when an operating time of the added clock function reaches the set reservation time, executing the specific function.

In accordance with another embodiment of the present invention, a device for executing a reserved function in a mobile communication terminal includes: an input unit for a user manipulation input; a controller for executing a clock function based on time information that is set by the user through the input unit; and a broadcasting reception unit to receive broadcasting data; wherein the controller extracts a time information from the received broadcasting data and when a reservation time for execution of a specific function is set, the controller executes the specific function in accordance with a real time determined through the use of the extracted time information.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Now, embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Broadcasting data in digital broadcasting systems such as Digital Multimedia Broadcasting (DMB) and Digital Video Broadcasting-Handheld (DVB-H) include broadcasting related information and time information, such as an Electronic Program Guide (EPG) and an Electronic Service Guide (ESG), in addition to audio data and video data. Time information included in the broadcasting data has the same correctness and precision as time information provided from a corresponding satellite, and has no significant difference from real time. By taking advantage of this time information, the present invention provides a method of executing a time reservation function at a correct time using time information included in the broadcasting data in an asynchronous mobile communication terminal such as a GSM mobile phone.

Figure 1:
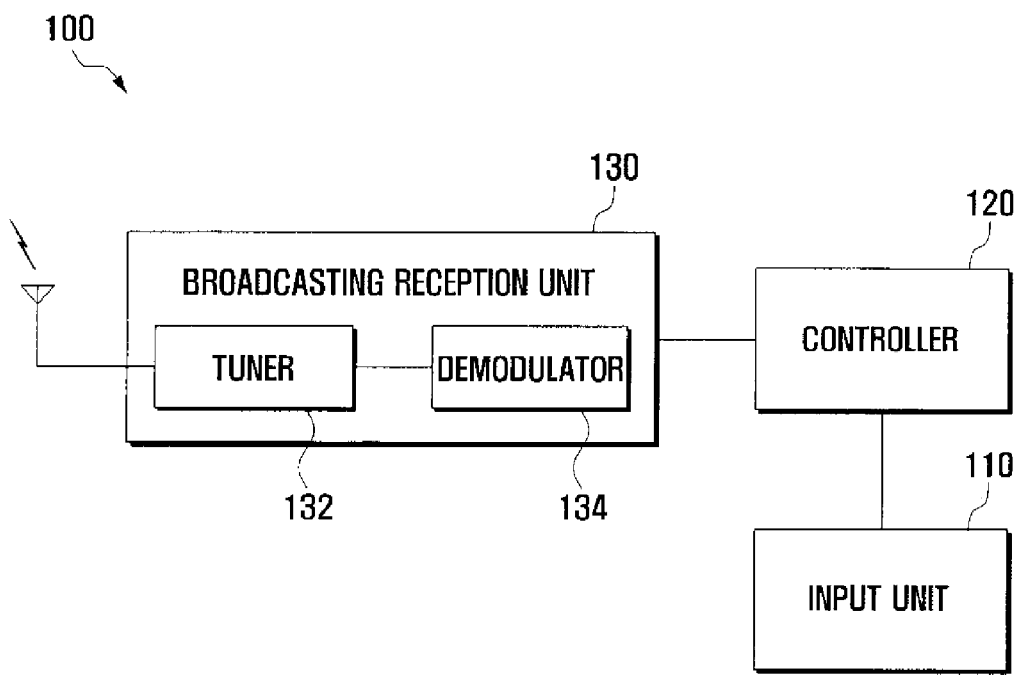
FIG. 1 illustrates a block diagram of a configuration of a device for executing a reserved function in a mobile communication terminal according to an exemplary embodiment of the present invention.

FIG. 1 illustrates a block diagram of a configuration of a device for executing a reserved function in a mobile communication terminal according to an exemplary embodiment of the present invention.

Referring to FIG. 1, the device for executing a reserved function 100 includes an input unit 110 for input of user input manipulation, a controller 120 for execution of a clock function of the mobile communication terminal, based on time information that is set using the input unit 110, and a broadcasting reception unit 130 for receipt of broadcasting data.

The broadcasting reception unit 130 includes a tuner 132 for tuning to a broadcasting frequency, and a demodulator 134 for demodulation of broadcasting data from a radio signal received through the tuner 132.

Broadcasting data received in the broadcasting reception unit 130 may be at least one of audio data and video data, EPG broadcasting related data, ESG broadcasting related data, and Program Specific Information/System Information (PSI/SI) data. The broadcasting data may be at least one Transport Stream (TS) packet. The TS packet can be received when a broadcasting function is executed. Time information can be included in the PSI/SI data. The PSI/SI data include time information in a table such as a Time Offset Table (TOT) or a Time Data Table (TDT).

The controller 120 includes at least one oscillator (not shown) for generating a clock time to execute the clock function. The oscillator can generate at least one clock time at 1 second time intervals.

The controller 120 extracts time information by analysis of broadcasting data received from the broadcasting reception unit 130. For example, the controller 120 extracts PSI/SI data by parsing the received TS packet, and extracts time information from the TDT or the TOT of the PSI/SI data.

Further, the controller 120 calculates a time difference between a time of the extracted time information and an operating time of a clock function and stores the calculated time difference. When a time is reached for executing a reservation function, such as an alarm function, morning call function, and reservation recording function, the controller 120 executes the set reservation function according to the real time taking into consideration the calculated time difference.

For example, if the time extracted from broadcasting data is 10 A.M. and the operating time is 10:10 A.M., the controller 120 stores a time difference of 10 minutes as the time difference information. In this case, if a broadcasting reservation recording time is set to 11 A.M., the controller 120 executes a reservation recording function at an operation time that is 10 minutes later than the set reservation recording time, based on the stored time difference information. The time difference information can be calculated and stored in time units of one second. For example, if the real time extracted from the broadcasting data is 2 A.M. and the operating time is 2:05 A.M., the controller 120 obtains a time difference between 7,200 seconds (2*60*60) and 7,500 seconds (2*60*60+5*60) and stores 300 seconds as the time difference information.

The controller 120 can calculate a time difference between a time of the extracted time information and an operating time of the clock function and notify the user of the time difference. For example, the controller 120 can notify the user that an operating time is not identical with a real time by displaying a message such as 'The operating time is set early by 5 minutes. Do you want to adjust?' The user, having received the notification that the operating time of the clock function is incorrect, can adjust the operating time of the clock function to the correct time. If a signal for adjusting the operating time is then input by the user, the controller 120 adjusts the operating time of the clock function to the time of time information extracted from the broadcasting data and can execute the function according to the adjusted operating time.

The controller 120 may execute an additional clock function based on the extracted time information. That is, a clock function using an operating time that is set by the user may be executed in a foreground of the mobile communication terminal, and another clock function using time information extracted from the broadcasting data may be executed in a background of the mobile communication terminal. If a reservation time for executing a specific function is set, the controller 120 can adjust the operating time of the clock function that is based on time information extracted from the broadcasting data and execute the specific function.

That is, a time that is set by the user is personally used by the user, and upon setting a reservation time for execution of a function, an operating time based on time information extracted from the broadcasting data is used for execution of a specific function.

For example, when an alarm function for notification of a specific schedule event at 11 o'clock is set by the user, if the operating time of a clock function that is operating based on a time information extracted from broadcasting data is 10:10, and the operating time of a clock function that is simultaneously operated by the controller 120 is 10 o'clock, the alarm function for notifying the user of the scheduled event is executed by the clock function that is operating based on the time information extracted from the broadcasting data.

Figure 2:
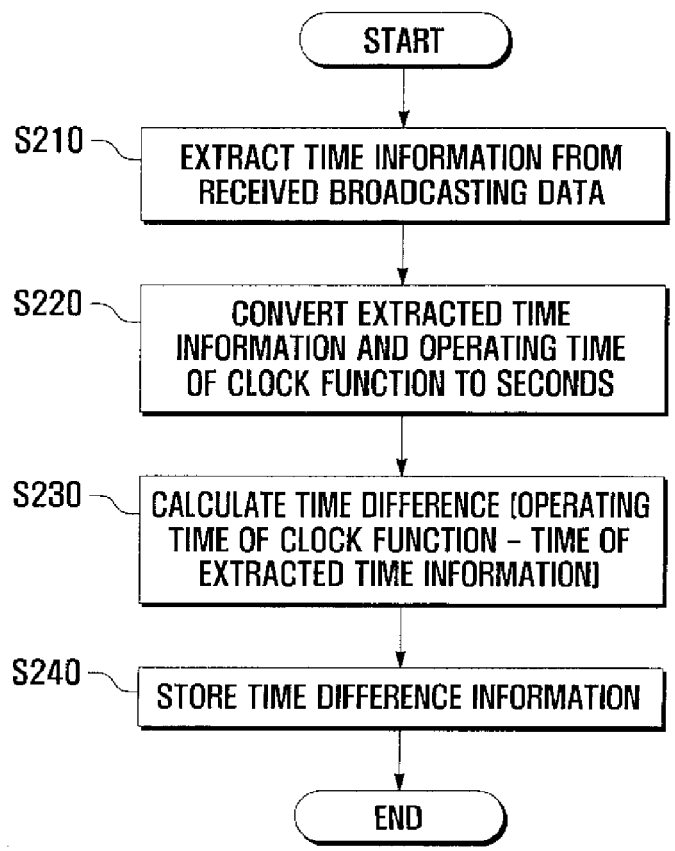
FIG. 2 illustrates a flowchart of a method of storing time difference information for executing a reserved function in a mobile communication terminal according to another exemplary embodiment of the present invention.
Figure 3:
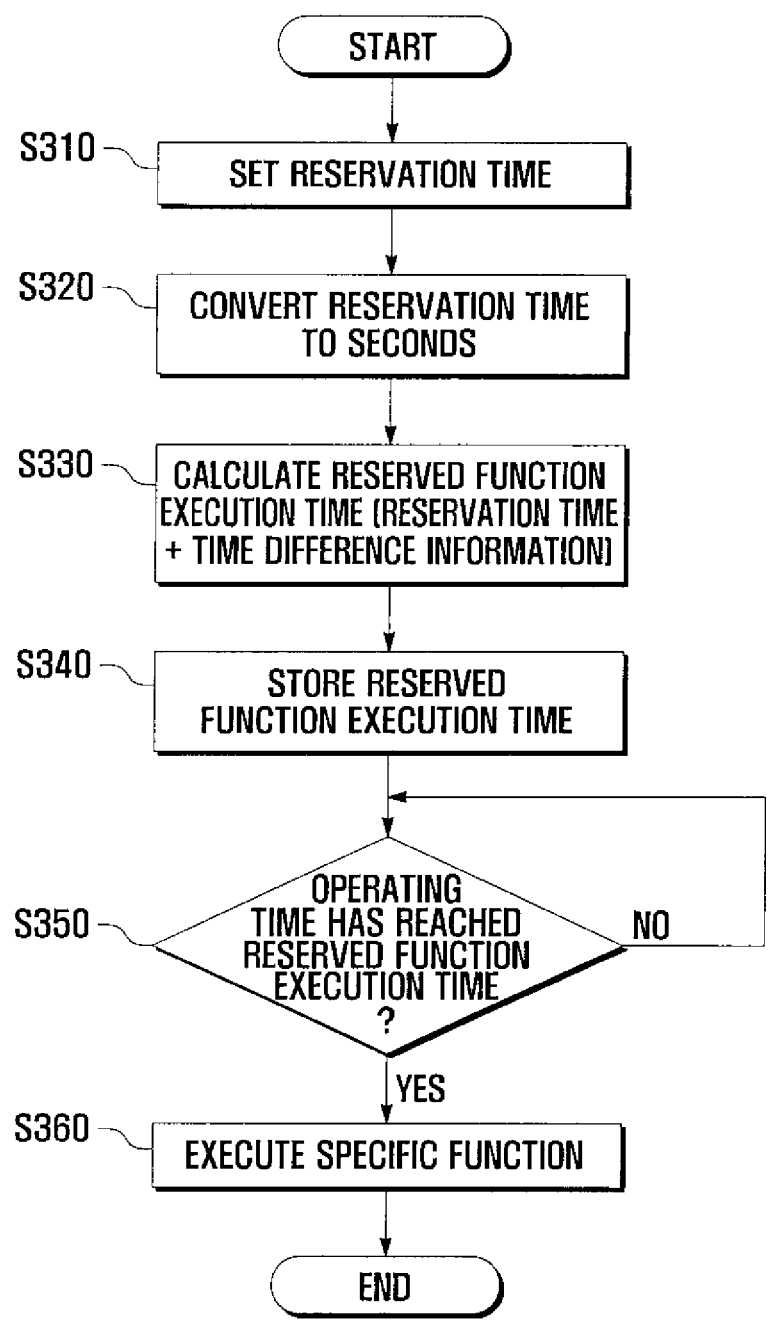
FIG. 3 illustrates a flowchart of a method of applying time difference information for executing a reserved function in a mobile communication terminal according to another exemplary embodiment of the present invention.

FIG. 2 illustrates a flowchart of a process of storing a time difference information for execution of a reserved function in a mobile communication terminal, according to another exemplary embodiment of the present invention. FIG. 3 illustrates a flowchart of a process of applying a time difference information for execution of a reserved function in a mobile communication terminal, according to another exemplary embodiment of the present invention.

Referring to FIG. 2, the controller 120 extracts a time information from a received broadcasting data (step S210). The controller 120 converts the extracted time information and an operating time of a clock function to units of one second (step S220). The controller 120 calculates a time difference by subtracting the time of the extracted time information from the operating time of the clock function (step S230). The controller 120 stores the calculated time difference as a time difference information (step S240). As the calculated time difference is stored, the time difference information is used in a process of setting a reserved function, as shown in FIG. 3.

Referring to FIG. 3, when a reservation time to execute a specific function is set (step S310), the controller 120 converts the units of the set reservation time to seconds (step S320). The controller 120 calculates a time (hereinafter, a 'reserved function execution time') to execute the specific function by adding the stored time difference information to the set reservation time (step S330). The controller 120 stores the calculated reserved function execution time (step S340).

The controller 120 determines whether an operating time has reached the reserved function execution time (step S350). When an operating time has reached the reserved function execution time, the controller 120 executes the specific function (step S360).

For example, if the time extracted from the broadcasting data is 11 A.M. and the operating time of a clock function operated simultaneously is 10:50 A.M., the respective times are 39,600 seconds and 39,000 seconds. Accordingly, the time difference, calculated by subtracting the extracted time from the operating time, is −600 seconds. If the user sets a reservation recording function for a broadcast that starts at 1 P.M., the reserved function execution time is 46,200 seconds, calculated by adding the stored time difference information (i.e. −600 seconds) to the set reservation time of 1 P.M. (i.e. 46,800 seconds). When the operating time reaches the reserved function execution time, i.e. 12:50 A.M., the set broadcast recording is executed. Therefore, in the mobile communication terminal in this example, in which a clock function is operating at a time that is 10 minutes later than the real time extracted from broadcasting data, reservation recording can be executed according to a real broadcasting time.

When the operating time of a clock function varies or when broadcasting data including time information are received, the controller 120 can update the time difference information.

Further, although not shown, the device for execution of a reserved function 100 in the mobile communication terminal may further include any of a display unit for displaying a screen of a display device such as a Liquid Crystal Display (LCD), a memory unit for storing data, a storage medium insertion unit for storing data by inserting an external storage medium such as a memory card, a camera module, radio frequency (RF) transmission and reception module, audio signal output device such as a speaker, sound signal input device such as a microphone, connection terminal for exchanging data with an external digital appliance, terminal for charge, and digital sound reproduction module such as an MP3 module. According to the trend of function convergence in digital appliances, the mobile terminal can be variously modified, and units similar to the above-described units may also be included in the device for execution of a reserved function.

Figure 4:
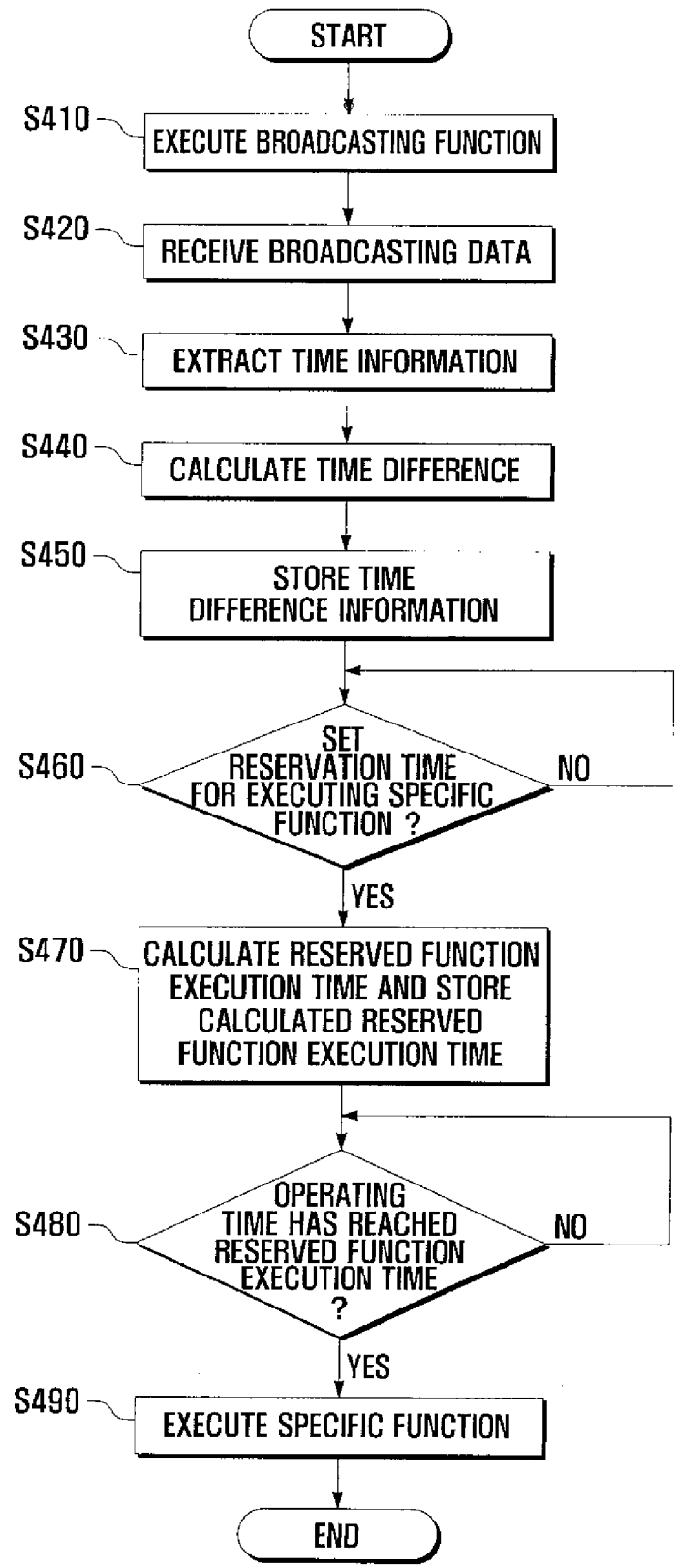
FIG. 4 illustrates a flowchart of a method of executing a reserved function in a mobile communication terminal according to another exemplary embodiment of the present invention.

FIG. 4 is a flowchart illustrating a method of executing a reserved function in a mobile communication terminal according to another exemplary embodiment of the present invention.

Referring to FIG. 4, the method of executing a reserved function includes the steps of: when a broadcasting function is executed, performing the steps of—(1) extracting time information included in a received broadcasting data, (2) calculating a time difference between the extracted time information and an operating time of a clock function, and (3) storing the calculated time difference as time difference information; and if a reservation time for executing a specific function is set and if the operating time has reached a reserved function execution time based on the stored time difference information, executing the specific function.

When a broadcasting function is executed (step S410), broadcasting data are received (step S420), and the controller 120 extracts time information from the received broadcasting data (step S430).

As described above, the broadcasting data may be PSI/SI data of TS packets. The time information can be converted into units of a second.

When the time information is extracted, the controller 120 calculates a time difference between an operating time of a clock function and the time of the extracted time information (step S440).

The controller 120 stores the calculated time difference as a time difference information (step S450).

The controller 120 determines whether a reservation time for execution of a specific function is set (S460). If a reservation time for execution of a specific function is set, the controller 120 calculates a reserved function execution time by adjustment of the set reservation time to reflect the stored time difference information, and the controller 120 stores the calculated reserved function execution time (step S470).

After storing the calculated reserved function execution time, the controller 120 determines whether the operating time has reached the stored reserved function execution time (step S480). When the operating time reaches the stored reserved function execution time, the controller 120 executes the specific function (step S490).

Figure 5:
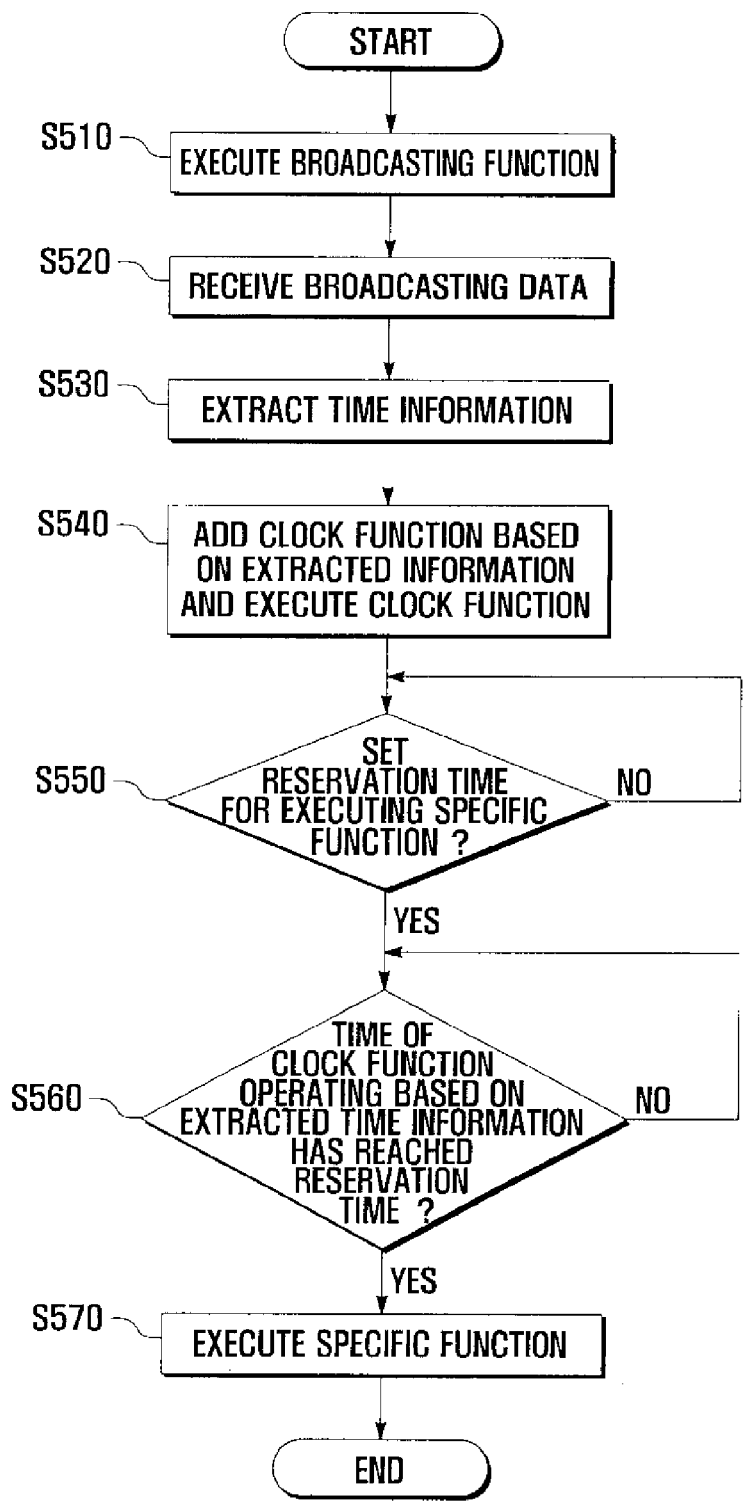
FIG. 5 illustrates a flowchart of another method of executing a reserved function in a mobile communication terminal according to another exemplary embodiment of the present invention.

FIG. 5 illustrates a flowchart of another method of executing a reserved function in a mobile communication terminal according to another exemplary embodiment of the present invention.

Referring to FIG. 5, the method of executing a reserved function includes the steps of: when a broadcasting function is executed, performing the steps of: (1) extracting a time information included in received broadcasting data, (2) adding a clock function based on the extracted time information, and (3) executing the clock function; and if a reservation time for executing a specific function is set and if the time of the added clock function has reached the set reservation time, executing the specific function.

When a broadcasting function is executed (step S510), broadcasting data are received (step S520), and the controller 120 extracts time information from the received broadcasting data (step S530).

The controller 120 executes a clock function based on the extracted time information (step S540). It is assumed that another clock function is previously executed based on a time set by the user.

The controller 120 determines whether a reservation time for executing a specific function is set (step S550). If a reservation time for executing a specific function is set, the controller 120 determines whether the time of the clock function operating based on the extracted time information has reached the set reservation time (step S560). When the time of the clock function operating based on the extracted time information reaches the set reservation time, the controller 120 executes the specific function (step S570).

As described above, in a device and method for executing a reserved function in a mobile communication terminal according to the present invention, by adjusting a time for executing a reserved function using time information extracted from a broadcasting data that provides a time as correct as a satellite time, the reserved function can be executed at the correct time in an asynchronous mobile communication terminal, in spite of a high possibility that the asynchronous mobile communication terminal has an incorrect time. Particularly, upon performing time-based reservation recording of broadcasting, the broadcasting can be recorded at a correct time.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method, operable in a mobile communication terminal, for executing a reserved function that is scheduled for execution at a reservation time, the method comprising:
   extracting a time information from a received broadcasting data;
   calculating a time difference between the extracted time information and an operating time of the mobile communication terminal,
   storing the calculated time difference as a time difference information;
   calculating a reserved function execution time based on the reservation time and the stored calculated time different information; and
   executing the reserved function when the operating time of the mobile communication terminal corresponds to the reserved function execution time.

2. The method of claim 1, wherein the received broadcasting data is at least one Transport Stream (TS) packet.

3. The method of claim 2, wherein the time information is extracted from Program Specific Information (PSI)/System Information (SI) data of the broadcasting data.

4. The method of claim 1, wherein calculating the reserved function execution time comprises:
   adding the reservation time and the stored time difference information.

5. The method of claim 1, wherein calculating the time difference-information comprises subtracting the extracted time information from the operating time of the mobile communication terminal.

6. The method of claim 1, wherein the reserved function is a broadcasting reservation recording function.

7. The method of claim 1, wherein the reserved function is at least one of: a morning call function and a schedule alarm function.

8. A method of executing a reserved function in a mobile communication terminal, the method comprising:
   extracting time information from received broadcasting data,
   determining a time difference between a current operating time of a clock function and the extracted time information, and
   executing the reserved function if a reservation time for executing the reserved function is set and when the operating time of the clock function reaches a calculated reserved function execution time, the calculated reserved function execution time being the sum of the reservation time and the time difference.

9. A device for executing a reserved function in a mobile communication terminal, comprising:
   an input unit for providing inputs;
   a controller for executing a clock function based on information provided through the input unit, the clock function generating an operating time of the device; and
   a broadcasting reception unit for receiving broadcasting data,
   wherein the controller extracts time information from a broadcasting data received by the broadcasting reception unit and when a reservation time for executing the reserved function is set, the controller executes the reserved function when the operating time of the device reaches a reserved function execution time, the reserved function execution time being determined using the reservation time and a time difference between the operating time at the time of receiving the broadcast data and the extracted time information.

10. The device of claim 9, wherein the broadcasting reception unit further comprises:
    a tuner for tuning to a broadcasting frequency; and
    a demodulator for demodulation of the broadcasting data from a radio signal received through the tuner.

11. The device of claim 10, wherein the broadcasting data is at least one TS packet.

12. The device of claim 11, wherein the TS packet is received when a broadcasting function is executed.

13. The device of claim 11, wherein the time information extracted from the broadcasting data is included in a PSI/SI data of the TS packet.

14. The device of claim 9, wherein the controller further comprises at least one oscillator for generation of a clock to execute the clock function.

15. The device of claim 9, wherein the controller:
    stores the time difference information.

16. The device of claim 9, wherein the controller:
    provides a notification of the time difference, and
    adjusts the operating time to a time based on the received broadcasting data in response to an adjustment signal.

17. The device of claim 9, wherein the controller adds a clock function based on the extracted time information and executes the added clock function.

18. The device of claim 17, wherein the controller executes, if a reservation time for executing a specific function is set, the specific function according to an operating time of the added clock function.

* * * * *